July 18, 1939.          P. ROMAN ET AL          2,166,194
CONTROL SYSTEM AND APPARATUS
Filed Feb. 26, 1937          5 Sheets-Sheet 2
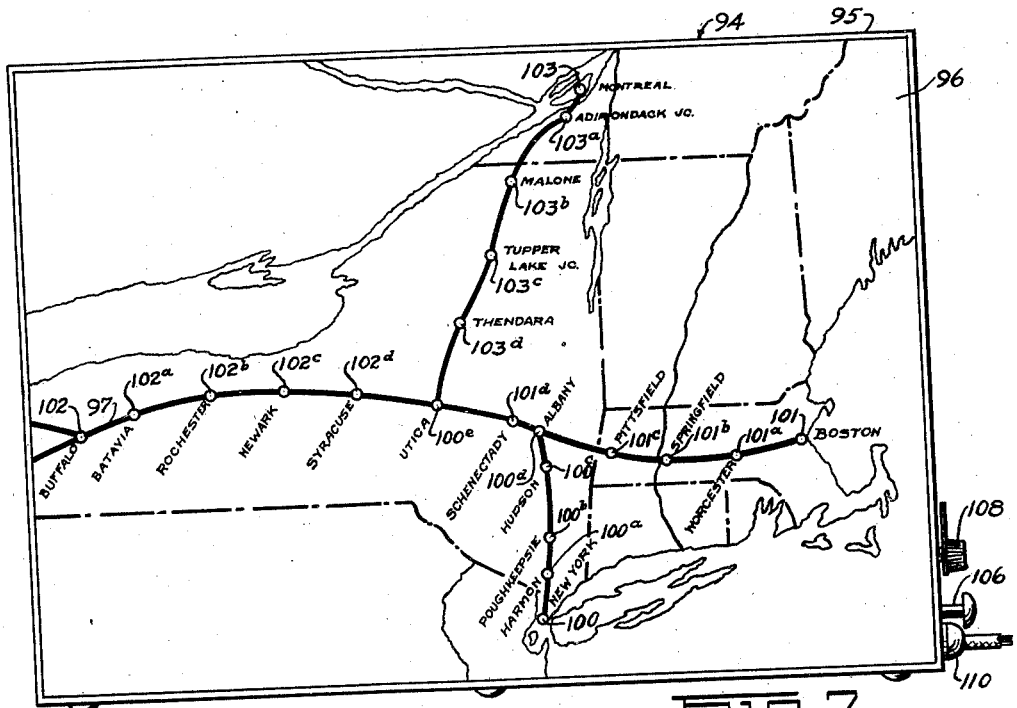
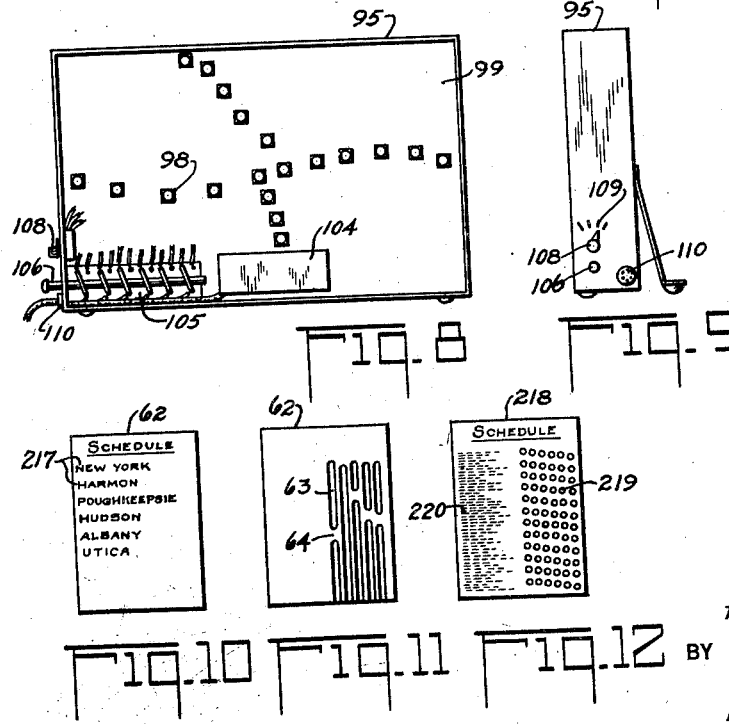
INVENTORS
Paul Roman.
Robert Baluta.
BY
John J. Shively
ATTORNEY

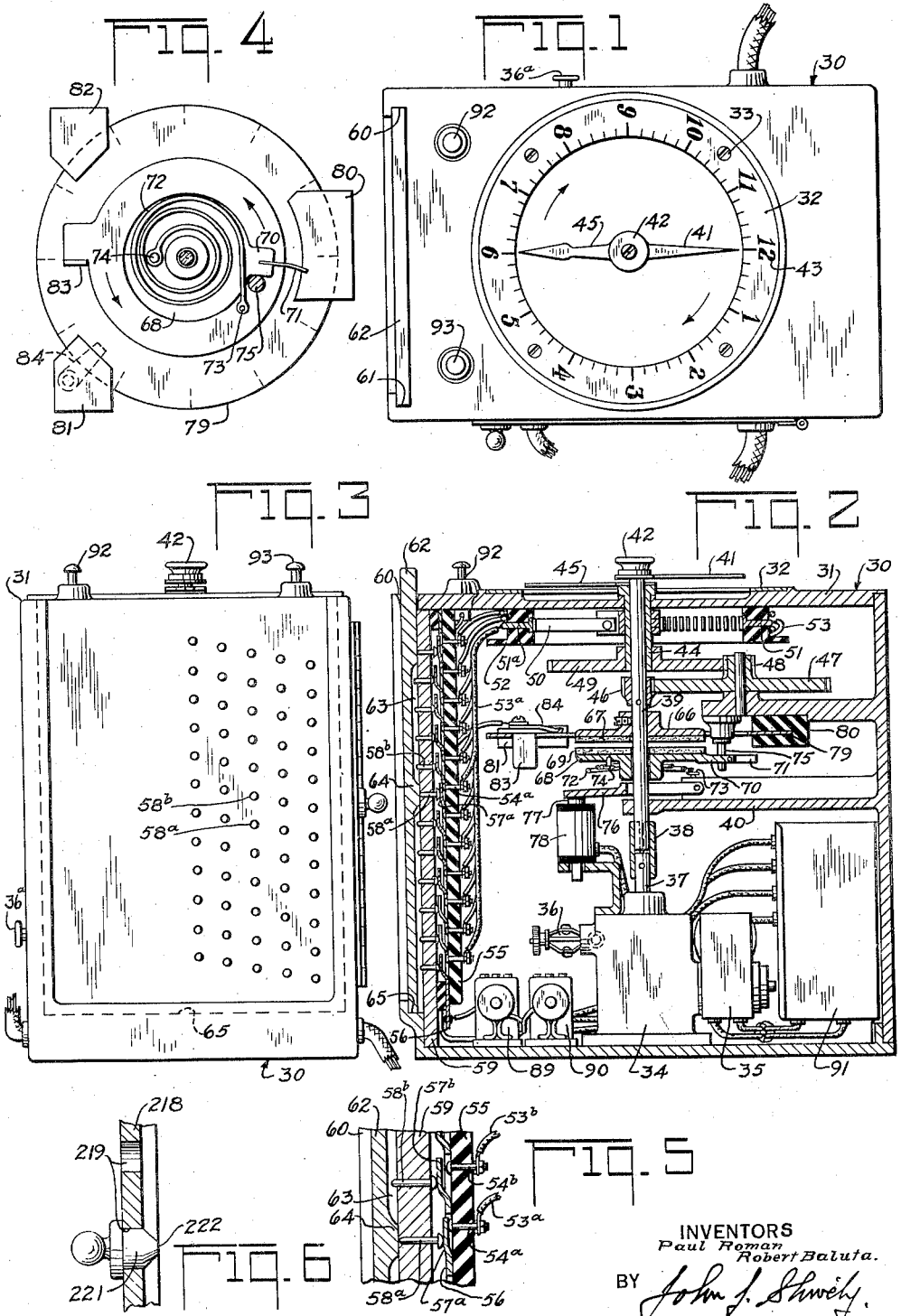

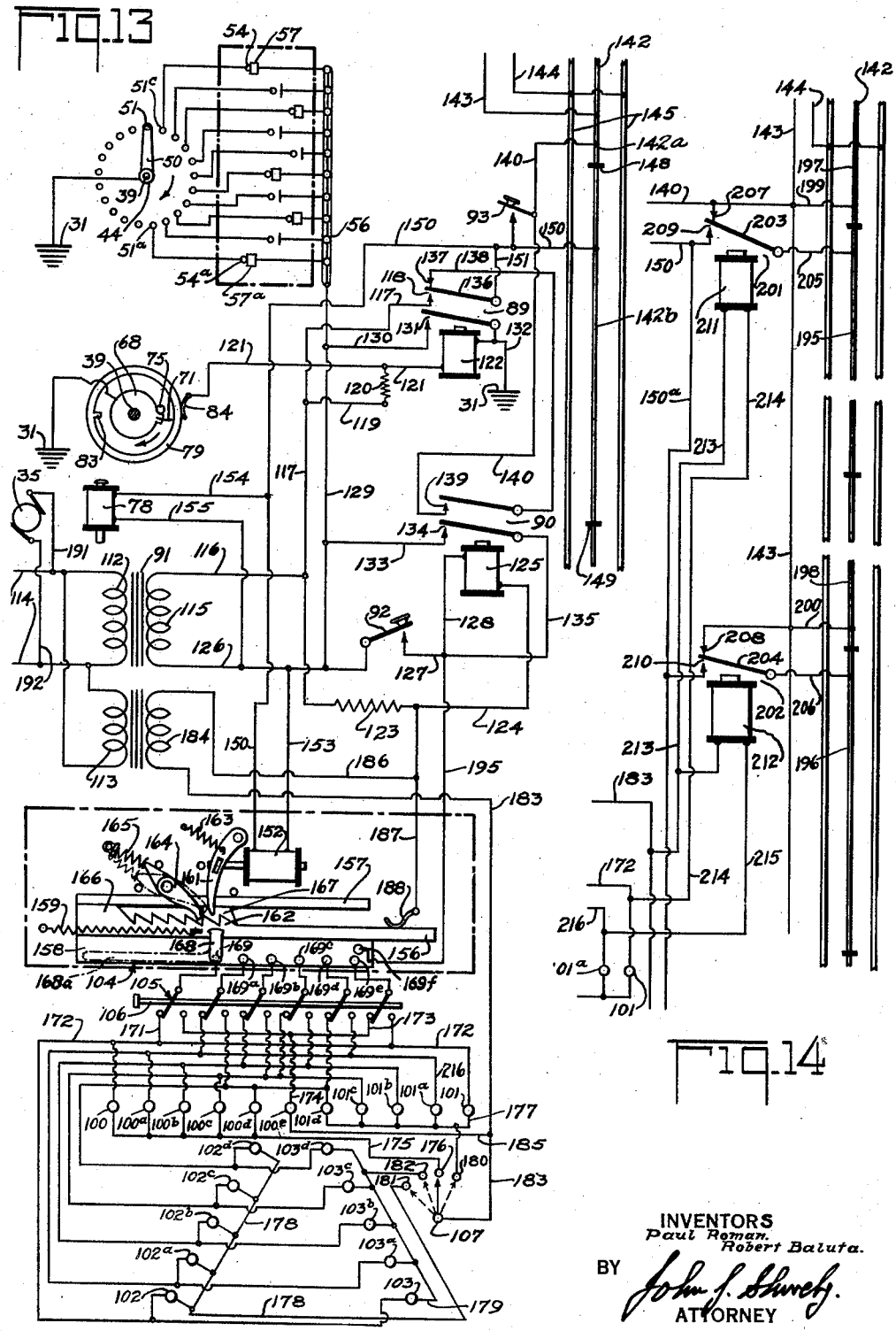

July 18, 1939.　　　P. ROMAN ET AL　　　2,166,194
CONTROL SYSTEM AND APPARATUS
Filed Feb. 26, 1937　　　5 Sheets-Sheet 4
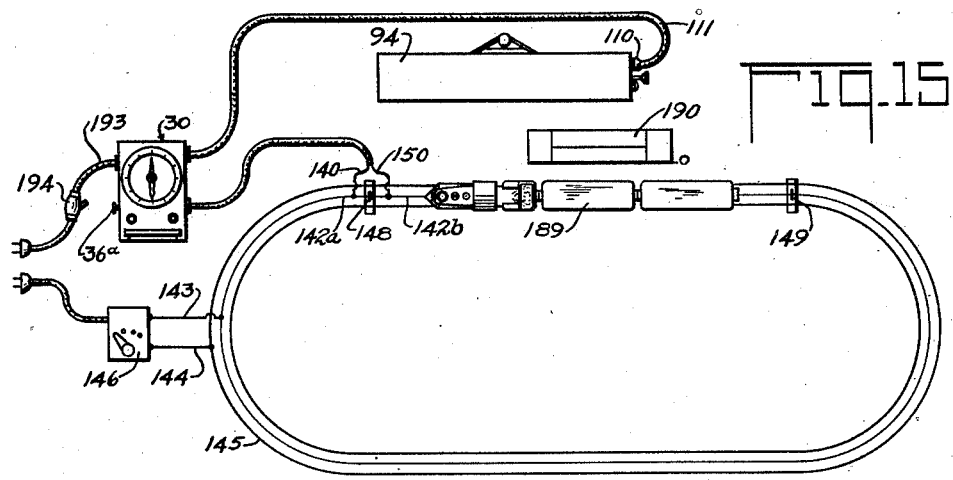
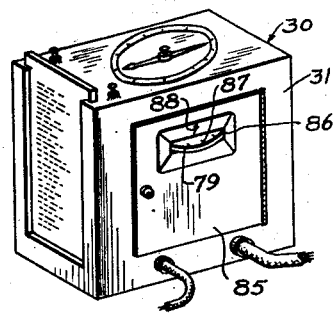
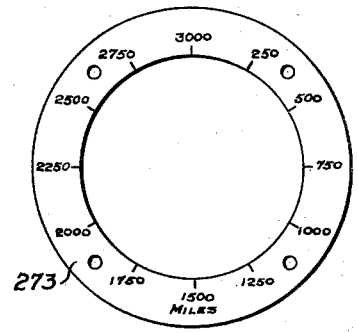
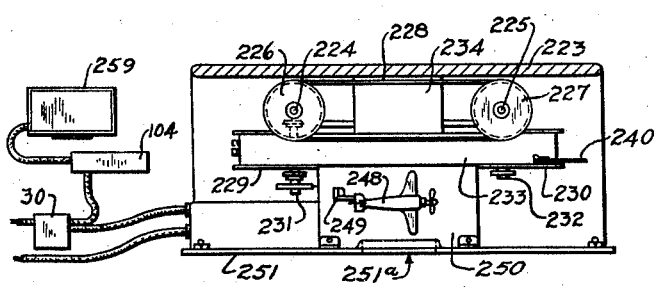
INVENTORS
Paul Roman,
Robert Baluta.
BY
ATTORNEY

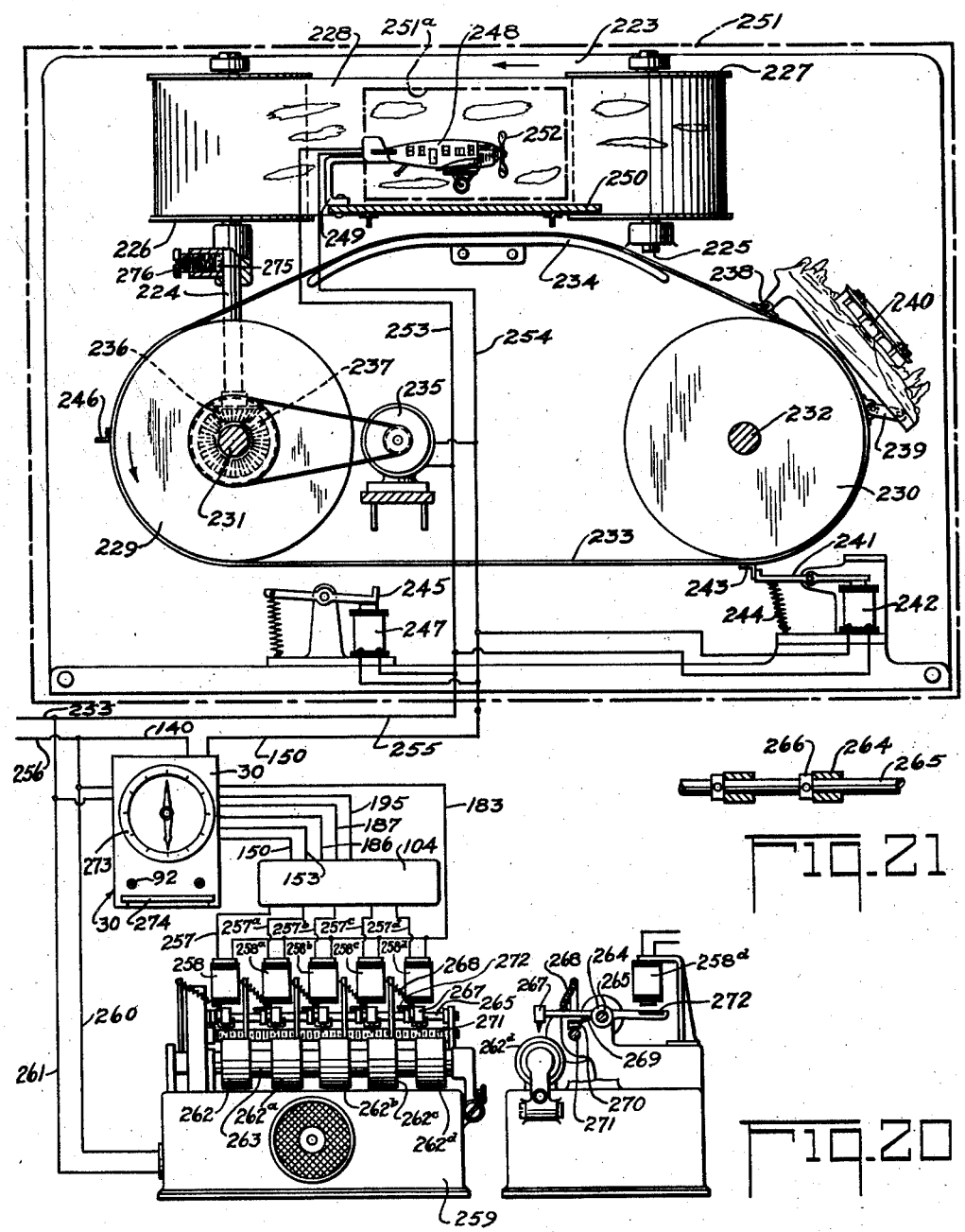

Patented July 18, 1939

2,166,194

UNITED STATES PATENT OFFICE 2,166,194

CONTROL SYSTEM AND APPARATUS

Paul Roman, White Plains, and Robert Baluta, New York, N. Y.; said Baluta assignor of two-tenths to said Roman Application February 26, 1937, Serial No. 127,868

17 Claims. (Cl. 246—3)

This invention relates to improvements in control systems and apparatus.

An object of the invention is to provide suitable means to control a series of events in predetermined order and relation and to synchronously set forth a sensory representation or identification of the events.

A further object is to provide means of the above type by which the events may be simulations of actual events and in which the relative spacings of the occurrences of the simulations may be substantially the same as those of the actual events, but wherein the total time cycle of the simulations may be less than or greater than that of the actual events.

Another object of the invention is to provide means of the above type especially applicable to display, amusement and instructive purposes.

Still a further object is to provide means of the above type applicable to toy railroad systems whereby the latter may be made to automatically carry out in simulation the schedules of actual trains while identifying successive train locations on a suitable map or the like and indicating the corresponding schedule times.

Other objects and advantages of the invention will become evident during the course of the following description.

The principal elements of a combination embodying the invention and adapted to simulate a series of actual events consist of a synchronizing device, a simulating device or combination of objects, and an identifying device. The synchronizing device includes a dial, carrying indicia setting forth the relative spacing of successive events, which spacing may be in terms of time, space, temperature, pressure, etc., according to the nature of the succession of phenomena being set forth; and the relation of the operations of the synchronizer may be determined by suitable templates applied to the device, the templates being prepared in accordance with the particular sequence of phenomena to be presented.

The simulating device may consist of a still object and a moving object, exemplified in one of the present illustrations by a toy railroad and train, respectively, but may consist of other combinations, such as a stationary model airplane and a moving background.

The identifying device is a combination adapted to present sensory impressions of the successive stages in the series by which each particular stage is properly identified. The word sensory is employed because while a typical presentation may be visual, as by a series of lights on a map which are illuminated to identify the station stops of a railway train, the identifications may also be auditory, as by successive phonographic reproductions describing successive stages in an airplane trip.

While it will become obvious to those skilled in the art that the invention is susceptible of a wide variety of adaptations and modifications without departing from the scope of the appended claims, its structure and operation are herein described as applied to two typical examples in connection with the accompanying drawings, in which:

Figure 1 is a plan view of a preferred form of the timing or synchronizing device;

Figure 2 is a vertical sectional view of the same;

Figure 3 is an end view of the same with the adjusting template removed;

Figure 4 is a detail bottom view of the time delay mechanism;

Figure 5 is an enlarged fragmental section of the adjusting template and scheduling contacts;

Figure 6 is a similar fragmental view of an alternative form of template structure;

Figure 7 is a front view of an identifying map structure;

Figure 8 is a reduced rear view of the same;

Figure 9 is an end view of the same;

Figure 10 is a front view of an adjusting template;

Figure 11 is a rear view of the same;

Figure 12 is a front view of the alternative form of template shown in Figure 6;

Figure 13 is an electrical diagram showing the connections of the system applied to a miniature railway;

Figure 14 is a diagram illustrating an alternative application of the device to a miniature railway;

Figure 15 is a plan view of the various units of the system applied to a typical toy railway;

Figure 16 is a perspective view of the synchronizer illustrating the means to adjust the time delay mechanism from the outside;

Figure 17 shows a dial applicable to the synchronizer and calibrated in terms of distance rather than time;

Figure 18 is a top view illustrating the device applied to a combination simulating the events of an airplane trip;

Figure 19 is a diagrammatic front view of the same including the electrical connections;

Figure 20 is an end view of the phonographic identifying means; and

Figure 21 is a fragmental detail view of the pick-up guide shaft of the same.

Referring to Figures 1 and 2, the numeral 30 generally indicates a synchronizing unit having a casing 31, preferably of metal, on the top of which is a ring dial 32 detachably secured thereto by any suitable means such as screws 33. Mounted in the bottom of the casing 31 is a clock work device 34, preferably operable by an electric motor 35 and provided with an adjustable speed governor 36 of the well known type commonly employed on phonograph motors and the like, the governor, if desired, being provided with the usual external adjusting knob 36a, Figure 1. The vertical output shaft 37 of the device 34 has secured thereto a split spring quill 38 resiliently embracing the lower end of a vertical drive shaft 39 journalled in a bracket 40 formed or secured in the casing 31. A hand 41, corresponding in the present illustration to the minute hand of a clock, is secured to a knob 42 fastened on the top of the drive shaft 39 and is adapted to sweep around the inner periphery of the dial 32 which in the form illustrated is provided with numerals 43 representing hours in the usual relation.

A sleeve 44, rotatably mounted on the shaft 39 and journalled in the top of the casing 31, carries on its upper end a hand 45 simulating the hour hand of a clock, the sleeve 44 and hand 45 being adapted to be driven from the shaft 39 at one twelfth the speed of the latter through a pinion 46, gear 47, second pinion 48 and second gear 49, Figure 2.

A resilient contact arm 50, Figure 2, is secured to the sleeve 44 in line with the hour hand 45 and is adapted to successively engage a series of contact points 51, 51a, etc., as the sleeve 44 and arm 50 revolve, the contact points 51 being disposed in a circular insulating ring 52 secured to the inside top of the casing 31.

The contact points 51, 51a, etc., are individually connected by lead wires 53, 53a, etc., to metallic pins 54a, etc., the pins being secured in and projecting slightly outwardly through an insulating plate 55. A resilient metallic plate 56, secured on the outside of the insulating plate 55, has a plurality of outwardly bent resilient tongues 57a, 57b, etc., overlying but normally out of contact with the ends of pins 54a, etc., as shown in enlarged Figure 5.

The tongues 57a, etc., press outwardly against pins 58a, etc., preferably of insulating material, and are slidably retained in an outer plate 59, the outer ends of the insulating pins normally projecting outwardly from the outer plate 59, as illustrated by pin 58b, Figure 5.

Grooved vertical ways 60 and 61, Figures 1, 2, 3 and 5, are adapted to receive a flat template 62 vertically slidable therein and having in its rear face a plurality of vertical grooves 63 interrupted at pre-determined points by bridges 64 as shown in Figures 2, 5 and 11. When the template 62 is slid downward in the ways 60 and 61 and comes into place against the bottom or stop shelf 65, any of the insulating pins resting under bridged portions of the grooves 63 are pressed inward. For instance, referring to Figures 2 and 5, the pin 58a is pressed inward by bridge 64, flexing the tongue 57a against the pin 54a and thereby establishing an electrical connection between the metallic plate 56 and commutator contact point 51a, Figure 2. From the foregoing it will be seen that for all bridged portions 64 existing in any groove 62, connections are established between the plate 56 and corresponding contact points of the commutator.

A flange 66, Figure 2, hereinafter referred to as the driving flange, is secured to the drive shaft 39 and carries a lower facing 67 of friction material. A second flange 68, hereinafter called the driven flange, is rotatably mounted on the shaft 39 below the driving flange 66 and has an upper frictional facing 69. A radial projection 70 on the driven flange 68 has secured thereto a resilient contact leaf 71, Figures 2 and 4. A spiral spring 72 is secured at one end to a pin 73 in the stationary bracket 40 and at the other end to a pin 74 in the lower face of the driven flange 68, urging the flange counter-clockwise and normally holding the projection 70 against a stationary stop 75. The spring 72 is dished upward, thus aiding gravity in normally holding the driven flange 68 in downward position so that its friction facing 69 remains clear of the driving frictional facing 67. The driven flange 68 is supported on a forked lever 76 the free end of which is in turn supported by the plunger 77 of a solenoid 78 of the type adapted to push upward when energized.

A conducting ring plate 79 is supported concentrically with the shaft 38 by means of grooved insulating blocks 80, 81, and 82 secured in the casing 31, the plate being rotatively retained in the blocks. A tongue 83 on the ring plate 79 projects downwardly into horizontal line with the resilient contact leaf 71. A spring brush 84 is secured to the insulating block 81 and bears against the surface of the ring plate 79, thus establishing electrical contact therewith and at the same time providing a frictional restraint against free rotation of the plate in the grooved insulating blocks.

It will be seen that if the shaft 39 is rotating clockwise, and the solenoid 78 is energized to thrust the driven flange 68 into frictional clutching engagement with the driving flange 66, the flange 68 will also be driven clockwise against the urge of the spring 72 at the same speed as the minute hand 41, moving the projection 70 away from the stop 75.

This rotation of the driven disc 68 will continue until the leaf contact member 71 engages the tongue 83 to deenergize the solenoid 78 in a manner hereinafter explained in connection with the wiring diagram, Figure 13, whereupon the driven flange 68 drops out of clutching engagement with the driving flange 68 and is revolved backward by the spring 72 until the projection 70 again engages the stop 75.

From the foregoing it will further be seen that, as the driven flange 68 when in engagement rotates at the same speed as the minute hand 41, the duration of its rotation from the energizing of the solenoid 78 to the instant of contact between the leaf 71 and the tongue 83 may be gaged in terms of time as indicated by the travel of the minute hand. It is also evident that the extent of this time interval is dependent on the circumferential position of the tongue 83. Therefore, the extent of this interval, hereinafter referred to as the time delay, may be adjusted by revolving the ring plate 79 in the grooved blocks 80, 81 and 82, against the friction of the spring member 84, and a given angular movement of the plate will produce a corresponding increase or decrease in time delay in accordance with travel of the minute hand 41. Referring to Figure 16, it will be seen that the casing 31 has a hinged door 85 to allow access to the interior of the casing. To allow for easy adjustment of the time delay mechanism from the outside, a depressed slot 86 is provided in the door 85, through which slot the edge of the ring plate projects. The top of the plate 79 may carry calibrations 87 adapted to cooperate with an arrow 88 above the slot 86.

A pair of double pole relays 89 and 90 is disposed in the bottom of the casing 31, which casing also contains a transformer 91 and carries in its top face two push-button switches 92 and 93, the functions and operations of these units being hereinafter set forth in connection with the wiring diagram, Figure 13.

Referring to Figures 7, 8 and 9, the numeral 94 generally indicates an identifying or map structure having a frame 95 carrying a railroad map 96 on which are shown routes 97 of an actual railway, in the case illustrated by certain trackage of the New York Central Lines in a zone comprising New York, Boston, Montreal and Buffalo. Properly located on the map 96 are the usual stations at which stops are normally scheduled. Sockets 98, Figure 8, are located on the rear side 99 of the map 96, in positions corresponding to the various stations, and normally support lamps visible from the front of the map when illuminated. In the present case the apparatus is arranged to identify scheduled runs from each of the above named cities to Utica as a terminal or divisional station, and the lamps identifying the various stations are designated in order by the following numerals:

| | | | |
|---|---|---|---|
| New York | 100 | Boston | 101 |
| Harmon | 100a | Worcester | 101a |
| Poughkeepsie | 100b | Springfield | 101b |
| Hudson | 100c | Pittsfield | 101c |
| Albany | 100d | Schenectady | 101d |
| Utica | 100e | Utica | 100e |
| Buffalo | 102 | Montreal | 103 |
| Batavia | 102a | Adirondack Jct | 103a |
| Rochester | 102b | Malone | 103b |
| Newark | 102c | Tupper Lake Jct | 103c |
| Syracuse | 102d | Thendara | 103d |
| Utica | 100e | Utica | 100e |

Disposed in the bottom of the frame 95 is a step-switch 104, hereinafter explained in detail in connection with the wiring diagram, Figure 13, a six-pole switch 105 operable by a rod 106 projecting through the end of the frame 95, and a four contact selector switch 107 provided with an external indicating handle 108 and dial 109. The inter-wiring between the foregoing switches and sockets and the lamp-sockets 98, being shown in detail in Figure 13, is omitted from Figure 8 in order to avoid unnecessary complication of the latter. A six-wire lead-in socket 110 may be provided to detachably connect the map structure 94 with the synchronizing unit 30 through a six wire cable 111 as shown in Figure 15.

Referring to diagrammatic Figure 13, it will be seen that the transformer 91 has two primary windings 112 and 113 adapted to be connected to a source of current supply by a common pair of supply leads 114. A secondary winding 115, cooperative with the primary 112, is connected on its upper side through leads 116 and 117 to a normally disengaged contact 118 of the relay 89, and is also connected through a branch lead 119, resistor 120 and conductor 121 with one side of the magnet 122 of relay 89, and through a second resistor 123 and lead 124 with one side of the electro-magnet 125 of relay 90. The conductor 121 is also connected through the brush 84 to the plate 79 of the time delay mechanism. The lower side of secondary 115 is connected through a lead 126 to the normally open push-button or starting switch 92, thence through conductors 127 and 128 to the other side of the magnet 125.

A conductor 129 connects the secondary lead 126 with the metallic plate 56. A branch 130 of conductor 129 leads to one side of a second normally open contact combination 131 of the relay 89, the other side of 131 being grounded to the frame 31 through a wire 132 which is also connected to the side of magnet 122 opposite the supply lead 121.

From secondary conductor 129 a second branch 133 leads to one side of a normally open contactor 134 of relay 125, the other side of 134 being connected through a branch 135 with the lead 128 and thence with the magnet 125 as previously described.

A movable switch member 136 of relay 89, cooperative with but normally disengaged from the contact point 118, is normally in engagement with a second contact 137 from which a wire 138 leads to one side of a second normally open contactor 139 on the relay 90. The other side of contactor 139 is connected through a lead 140 to the normally charged portion 142a of the third rail 142 of a toy railway track, the latter being normally supplied with current through conductors 143 and 144 leading respectively to the third rail 142 and the main rails 145 from the usual transformer 146, Figure 15. The third rail 142 includes a portion 142b insulated from the remainder thereof by means of terminal insulating members 148 and 149. A wire 150, connected to the portion 142b, has a branch 151 connected to the movable switch member 136 of relay 89. The wire 150 leads to one side of a solenoid 152 forming part of the step-switch 104, the other side of 152 being connected through leads 153 and 126 to the lower side of the secondary 115. A branch 154 of wire 150 is connected to one side of the time delay solenoid 78, the other side of 78 also being connected through lead 155 to lead 126, thence to the lower side of secondary 115.

The step-switch 104 may be of any suitable type, that illustrated having a metallic bar 156 slidably mounted in insulating guides 157 and 158 and urged to the left by a tension spring 159. The solenoid 152 has a plunger 160 adapted to operate a swinging claw 161 which normally is held clear of the ratchet teeth 162 on the bar 156 by a spring 163, but adapted to swing downward to move the bar one tooth to the right when the solenoid is energized. A wide faced pawl 164, normally urged clockwise by a toggle spring 165, engages the teeth 162 to hold the bar 156 from returning after each advance to the right. Abutments 166 and 167, attached to the bar 156 behind the teeth 162 so as to clear the claw 161 at all times, are adapted to engage the wide-faced pawl 164 at the forward and rear extremities respectively of the bar's movement.

As the bar 156 moves to the right the movement of the pawl 164 in riding over the teeth 162 is not sufficient to throw the pawl over center with respect to its toggle spring 165, so that the pawl operates in the usual manner as previously noted. As the bar makes its last movement toward the right, however, the abutment 166 encounters the pawl and throws it over center into the position shown in dotted and dashed lines, in which position it is held clear of the teeth 162 by the spring 165. When, thereafter, the solenoid 152 is deenergized and releases the bar 156, the latter is drawn to the left by the tension spring 159 until the second abutment 167 encounters the pawl 164 to throw the latter back over center to normal operating position as shown. By this means it is evident that after a complete series of movements to the right the step-switch is automatically reset to initial position as shown. A brush 168 attached to the bar 156 normally rests on a contact point 169 and is adapted to successfully engage contact points 169a, 169b, 169c, 169d and 169e upon successive steps of the bar to the right.

The brush 168 on its final step just after it starts its engagement with point 169e also engages an auxiliary point 169f.

The contact point 169 is normally connected through a contactor 170 of the reversing switch 105, a lead 171, and a conductor 172 and branches thereof with lamps 100, 101, 102 and 103, while contacts 169a, b, c, d and e are similarly connected by parallel contactors of the switch 105 and similar leads to the corresponding lamps of the 100, 101, 102 and 103 series in the order of the stop stations of the four previously described routes, the last point 169e being connected through conductor 173 and a branch 174 to the common terminal lamp 100e corresponding to Utica on the map 96.

If the reversing switch 105 is thrown to the right by pushing the rod 106, the first point 169 is connected through 173 and 174 to the lamp 100e while the last point 169e is connected through conductor 172 and its branches to the lamps 100, 101, 102 and 103. Similarly, the intermediate station lamps are connected to the contact points of the step-switch 104 in reverse order, that is, from Utica outward.

A common wire 175 connects all lamps of the 100 series, except 100e, to one station 176 of the four-station selector switch 107. Similarly, common wires 177, 178 and 179 connect all lamps of the 101, 102 and 103 groups with stations 180, 181 and 182 of the selector switch 107. From the switch 107 a conductor 183 leads to the lower side of a secondary winding 184 cooperative with the primary 113 of the transformer unit 91. The lamp 100e, representing the devision point, Utica, and therefore operating on all routes illustrated, is connected past the selector switch 107 directly to conductor 183 by means of a wire 185. From the secondary 184 conductor 186 leads to a wire 187 connected to a brush 188 engaging the sliding bar 156 of the step switch, the wire 187 also being connected to the lead 124 between the resistance 113 and the magnet 125.

It will be seen from the foregoing description that if the secondary 184 is energized and the step-switch 104 be actuated, station lamps of whichever route is connected through the selector switch 107 will be successively illuminated beginning at the outer terminal station and progressing toward Utica if the reversing switch 105 is in the position shown, or in the reverse direction if switch 105 is thrown to the right.

The operation of the device is as follows, taking for example the regular schedule of a New York Central train from New York to Utica:

A template 62, preferably having the schedule of the particular New York Central train printed on the front thereof as shown in Figure 10, is inserted in place in the grooved ways 60 and 61 as shown in Figure 2. The rear grooves 63 of the template 62 have bridges 64 adapted, by depressing pins 58a, etc., in the manner previously explained, to establish connections between the metal plate 56 and commutator points of the 51 series so situated as to be successively engaged by the resilient arm 50 as the hour hand 45 reaches positions indicating the times of arrivals at successive stations on the regular schedule.

Initially the bridging connection between the charged rail portion 142a (the track having been charged in the usual way by connection of the operating transformer 146, Figure 15) is open, as this bridging connection includes the normally open contactor 139 of relay 90. Therefore, an electric train 189, Figure 15, engaging the insulated portion 142b will have no connection with the charged portion 142a and will thus remain stationary, preferably in front of a station 190, as illustrated in Figure 15.

The electric clock motor 35 has taps 191 and 192 across the supply cable 193 preferably equipped with a switch 194, Figure 15. The switch 194 being closed, the clock is started and the transformer 91 is energized, causing current to flow from the secondary 184 through the conductor 186, conductor 187, brush 188, bar 156, brush 168 and contact point 169 to the reversing switch 105, thence via conductors 171 and 172 to the lamp 100 indicating New York on the map 96, thence through the conductor 175, the station or throw position 176 of the selector switch 107 and conductor 183, back to the secondary 184. The lamp 100 is thereby illuminated on the map showing that the stationary train is in the New York station. The operator watches the clock hands (which may be previously set to any desired position by means of the knob 42, due to the presence of the friction coupling quill 38 on the drive shaft 39) until they indicate the starting time of the actual train as given on the schedule template 62, Figure 10. When the starting time is indicated, the operator depresses the push-button switch 92, causing current from the secondary 115 to energize the magnet 125, through the resistor, thereby closing the contactors 134 and 139. The closing of 134 causes current to flow around the switch 92 so that when the latter is released the magnet 125 remains energized to hold the relay 90 in closed position.

The upper contactor 139 being closed, the bridging connection is completed between the insulated third rail portion 142b and the charged portion 142a, energizing the former, the completed bridging connection leading from charged third rail portion 142a (the latter receiving its charge from supply conductor 143) through conductor 140 to closed contactor 139 of relay 90, thence through conductor 138, contact point 137 and movable arm 136 of relay 89, conductors 151 and 150 to the insulated portion 142b. Since outer rails 145 are connected to the second supply conductor 144, a train engaging the portion 142b and outer rails 145 is now thrown in circuit between the supply conductors 143 and 144, the latter being connected to the supply transformer 146, Figure 15, as previously noted. The train 189, Figure 15, is thereby started and travels around the track, continuing to travel until the hands of the timing or synchronizing device 30 indicate the time of the first scheduled stop, namely Harmon. At this point the contact arm engages a contact point such as 51c, Figure 13, which has been previously connected through pin 54 and tongue 57 to the metallic plate 56. As the arm 50 is grounded through its metallic supporting structure to the frame 31, and as the magnet 122 of relay 89 is also grounded to 31, a circuit is established from the upper side of secondary 115 through the lead 116, conductor 117, lead 119, resistance 120 lead 121 magnet 122 and lead 132 to ground 31, thence back through ground to contact arm 50, thence through the point 51c, contact members 54 and 57, plate 56 and conductors 129 and 126 to the lower side of secondary 115.

By the connection thus established, the magnet 122 is energized, closing the contacts 118 and 131 and opening the contacts 136 and 137. The opening of 136 and 137 breaks the bridging connection previously described between the insulated third rail section 142b and the charged portion 142a, so that as the train enters the section 142b its circuit is broken and the train stops at the station 190.

At the same time, the closing of contact 131 establishes a direct connection from the lower side of secondary 115 through the conductors 126, 129, 130; the contact 131, its arm and attached short leads to the magnet 122, thence through lead 121, resistor 120, lead 119, and conductors 117 and 116 to the upper side of the secondary 115, so that when the arm 50 breaks the ground circuit by travelling out of engagement with the point 51c, the magnet 122 is still supplied with current from the secondary 115 and consequently remains energized. The simultaneous closing of contact 118, allows current to flow from secondary 115 through conductors 116, 117, contact 118, arm 136, leads 151 and 150 to the step-switch solenoid 152, thence through leads 153 and 126 back to the secondary 115. The solenoid 152 advances the bar 156 one step to the right, causing the lamp 100a on the map to be illuminated as the train stops, thus identifying the station stop as Harmon in accordance with the schedule.

The closing of contact 118, which has connected lead 150 with the upper side of secondary 115 through the leads 116, 117, contact 118, arm 136 and lead 151 to the lead 150 as just described, also allows current to flow from lead 150 through lead 154 to the time delay solenoid 78, thence through conductors 155 and 126 back to the secondary coil 115. The solenoid 78 being energized, causes clutching of the driven flange 68 as previously described. As set forth, the flange 68 revolves until its contact leaf 71 touches the tongue after a length of time predetermined by the circular setting of plate 79, during which time the train 189 remains stationary at the station identified as Harmon. The flange 68 is grounded to the frame 31 both through its metallic support and the spring 72. When, therefore, the leaf 71 engages the tongue 83, the current hitherto flowing from the secondary 115 through leads 116, 117, 119, through the resistance 120, lead 121 and magnet 122, thence through contact 131, lead 130, conductor 129 and lead 126 back to the secondary 115, is now shunted from the secondary 115 through leads 116, 117, 119, through the resistance 120, lead 121 spring member 84, ring plate 79, tongue 83, and leaf 71 to ground on casing 31, thence back through ground on casing 31 and lead 132, contactor 131 and lead 130 to the conductor 129, thence through lead 126 to the secondary 115. The current being shunted or "short-circuited" around the magnet 122, the latter is deenergized, breaking the contacts 118 and 131 and allowing closure of contact 137. The latter closure restarts the train by restoring the bridging connection previously traced between the third rail portions 142a and 142b, while at the same time the time delay solenoid 78 and step-switch solenoid 152 are de-energized.

By the foregoing it will be seen that the train has been started on schedule from its station identified by the lamp 100, travelled a simulated length of time required by the schedule for the first leg of its trip, stopped on scheduled time at a station identified simultaneously on the map as Harmon by the lamp 100a, remained at Harmon a pre-determined simulated time (which time is gaged by travel of the minute hand 41) then started on the next leg of its journey. When the timing device or synchronizer has moved forward a simulated length of time called for by the schedule it again operates through the next successive set of connections pre-determined by the template 62, again stopping the train in accordance with the schedule, and actuating the step-switch to identify the next scheduled stop as Poughkeepsie by illumination of the lamp 100b on the map, at which station the train 189 is again held the pre-determined stop time by action of the time delay device as previously set forth.

The device thus continues to control the train and indicate stops on the map in synchronism with the time indications on the synchronizer, until the final stop representing Utica is reached. When the contact member 168 of the step-switch 104 engages the point 169e to light the utica lamp 100e, the brush member 168 also engages the auxiliary point 169f and a connection is established thereby from the lead 124 through the conductor 187 and a releasing lead 195 to the wire 135, thence through closed contactor 134, lead 133, conductors 129 and 126 to the lower side of the secondary 184. By this means current from the upper side of 184 through the resistance 113 is shunted directly around the magnet 125 instead of through it, causing the magnet 125 to be de-energized and allow the contactors 134 and 139 to open.

Thereafter, the train is held stationary, as the contact 139 remains open, and at the completion of the time delay operation, during which the lamp identifying Utica on the map remains illuminated, the step switch solenoid 152 is released. As the pawl 164 has been disabled by the abutment 166, as previously described, the spring 159 returns the mechanism to initial position. It is obvious that if desired the abutment 166 may be omitted and the pawl 164 released by manual means. The brush 168 may be constructed with a trailing extension 168a to maintain contact with the points 169, etc., until completion of the run, thus tracing the route traveled. If the switch 140 is constructed with a large number of points 169, etc., to cover a long route as hereinafter noted, the auxiliary point 169f may be duplicated at various points in the path of brush 168 to provide divisional stops.

If desired, the schedule may then be repeated by again closing the push switch 92, or if desired, a template adapted to establish a schedule set up for a run from one of the other starting points may be substituted for template 62, the corresponding route selected by means of the selector switch 107, and the new schedule carried out in the manner described. Similarly, by the use of properly prepared schedule templates and the reversing switch 105, scheduled runs from Utica outward over any of the four divisions may be carried out and synchronously identified on the map.

In carrying out the scheduled runs described, a typical speed at which the clock mechanism operates in relation to actual clock speed may be sixty to one; that is, one revolution of the hour hand 45, simulating a period of twelve hours, may be performed in twelve minutes. By adjustment of the governor 36, Figure 2, the speed may be varied, and it is obvious that for various purposes the clock mechanism may be adapted to operate in any desired relation to actual clock speed, the successive simulated events always taking place in their proper scheduled relation throughout the cycle.

While the apparatus has been illustrated as including provision for five scheduled stops, the map and stepswitch of course may be constructed to provide as many stations as may be desired, for instance to simulate local train runs or as in the case of a large map illustrating a complete transcontinental routing. The device has also been illustrated as controlling a simple form of toy railway system in which the same toy station 190 is used to represent the various stations at which stops are scheduled. In the case of more elaborate systems, in which it may be desired to provide individual toy stations with appropriate surroundings to represent the various actual stations on the schedule, the variations in wiring arrangement shown in Figure 14 may be used.

Referring to Figure 14, the numerals 195 and 196 designate two of any desired number of insulated sections of the third rail 142, the charged or main sections 197 and 198 of the rail being connected through branches 199 and 200 with the supply line 143. Relays 201 and 202 have switch arms 203 and 204 connected to the sections 195 and 196 respectively through wires 205 and 206 the arms normally engaging contacts 207 and 208 connected to the line 143 to which is also connected the conductor 140. The conductor 150, which in Figure 13 is connected to the insulated rail section 142b, in the arrangement shown in Figure 14 leads instead to a conductor 150a having branches to contacts 209 and 210 adapted to be engaged by arms 203 and 204 respectively when the relay magnets 211 and 212 are energized.

The relay magnets 211 and 212 are connected on one side through a common wire 213 to the conductor 183 which, as shown on Figure 13, forms the return connection from the station lamps to the secondary 184 of transformer 91. The other side of magnet 211 is connected through lead 214 to the conductor 172 leading from the reversing switch 185, Figure 13, to the lamp 101 and corresponding lamps of the other three series. The other side of magnet 212 is similarly connected through lead 215 to the wire 216 supplying current to lamp 101a and corresponding lamps of the other three series. Similar relays and connections may be provided to control insulated track sections for the various other stations throughout the system.

In operation, when in the course of carrying out the schedule, the wire 172 is energized through the stepswitch 104 to operate the lamp 101 or corresponding lamp of another series, the magnet 211 is also energized, breaking the direct connection through contact 207 from the third rail section 195 to the line 143 and bringing the arm 203 into contact with the point 209, thus connecting the section 195 to the arm 136 of relay 89, Figure 13. As the contact is broken at 207, as noted, and also at 137, Figure 13, the train is stopped on the rail section 195 corresponding to the section identified on the map by the lamp 101. Similarly, the operation of relay 202 stops the train on section 196 when lamp 101a is energized, and so on throughout the system.

The purpose of connecting the insulated rail sections 195 and 196 through the contact point 209 and 210 to the relay 89 is to place the various sections under control of the latter relay so that no matter which station in the system is chosen as the starting station for a scheduled run, the run may be started by depressing the starting switch 92.

It will be evident from the foregoing description that in the same way that the various track sections are controllable by the apparatus through relays 201, 202, etc., other apparatus and accessories of the miniature railway system such as signals, switches, etc., may be controlled in conjunction with the schedule. Also, stops need not be provided only at stations, as in elaborate systems regular stops may be made and identified at coal chutes, water tanks, etc., and the latter indicated on a large scale map in the manner described.

The operator may wish on some occasions to exercise partial manual control over the apparatus during the carrying out of a schedule, for instance omitting a station stop. For this purpose the push button switch 93 is connected between wires 140 and 150 as shown in Figure 13. The operator removes from its socket the map lamp corresponding to the stop to be omitted, then having started the train on its run, he observes the regularly scheduled time of the stop in question. When the clock hand indicates approach to this time, the operator closes the push-button switch 93 and holds it closed until the time for starting after the scheduled stop has been passed. By this means, the connection between the rail portion or section 142b and the charged portion 142a is maintained through the scheduled stop time and the stop is omitted.

It has been shown that the conditioning of the synchronizing device 30 for carrying out a predetermined schedule is accomplished by the location of the bridges 64 along grooves 63 of the template 62 in accordance with the schedule 217 on the back of the template, as illustrated in Figures 2, 5, 10 and 11. In some cases the operator may wish to arrange his own schedule, and for this purpose a modified template blank 218 may be provided having holes 219 therethrough opposite time indicia 220 on the back of 218 as shown in Figure 12. In arranging the template, the operator chooses on the index 220 the times at which he wishes to schedule successive stops, and inserts in each hole 219 opposite a chosen time figure a tightly fitting plug 221 as illustrated in Figure 6. The plugs 221 have tapered noses 222 adapted to depress the pins 58a, etc., in the same manner as bridges 64 of template 62. When the template consisting of the blank 218 carrying the plugs 221 is placed in position on the unit 30, the latter is conditioned in the manner already described to cause the operator's new schedule to be carried out.

The foregoing description has shown the invention as controlling a series of simulated events, that is stops, starts and runs of the miniature railway train, taking place in predetermined relation indicated in terms of simulated time increments, the events being identified visually on the map in synchronism with their occurrence.

It will be understood that while, to avoid undue complication of the electrical diagram, Figure 13, the commutating means has been shown thereon with some of the idle contact points omitted, in practice the number of these points may be as great as desired within the limits of practical construction, the present structure providing sixty points. Referring to Figure 4, the limits of adjustment of the time delay are determined by the engagement of the tongue 83 with the block 80, the shortest time being greater than that required for the arm 50 to engage, traverse and disengage any single contact member.

In Figures 17, 18, 19 and 20 the invention is shown as applied to an advertising combination setting forth the successive landings of an airplane during the course of a scheduled flight, the relation between simulated stops being defined in terms of distance rather than time, and the various landing locations being identified by audible means.

Referring to Figures 18 and 19, the numeral 223 indicates a frame to which are journalled in any suitable manner two vertical shafts 224 and 225 carrying drums 226 and 227. A wide endless belt 228 is mounted on the drums 226 and 227, and may be painted on its outer surface with clouds to simulate sky. A pair of horizontal drums 229 and 230 on rotary shafts 231 and 232 are located below and slightly forward of the drums 226 and 227. A second belt 233 is disposed on drums 229 and 230 and its upper reach is slidably supported on a stationary guide 234 which slopes downward at both ends.

A motor 235 is belted to the shaft 231 to drive the latter and the drum 229, while the vertical shaft 224 is geared to the shaft 231 by bevel gears 236 and 237 so proportioned that the peripheral speed of vertical drum 226 is the same as that of the horizontal drum 229. Secured to the belt 233 by a hinge 238 at one end and a link 239 at the other is a cut-out and painted image 240 of an airport station. An electric latch 241, Figure 19, is held in the position shown when its magnet 242 is energized and in this position engages a small fin 243 secured to the belt 233, a spring 244 being provided to disengage the latch from the fin 243 when the magnet 242 is de-energized. A second electric latch 245 is adapted normally to engage a second fin 246 on the belt 233, but is held clear thereof, as shown in Figure 19, when its magnet 247 is energized. It will be understood that the fins 243 and 246 are laterally off-set from each other, in order that neither may engage the wrong latch.

A miniature airplane 248 is mounted on a suitable bracket 249 secured to a shelf 250 in front of the belt 228. The shelf 250 is fastened to a front wall or shield 251 shown in top elevation in Figure 18 and removed in Figure 19 to disclose the mechanism. The airplane 248 may have a propeller 252 driven by a small motor (not shown) concealed in the nose of the plane and adapted to receive current through wires 253 and 254, shown diagrammatically in Figure 19. The shield 251 is provided with a window 251a through which the airplane 248 may be viewed against the background or sky provided by the belt 228.

The motor 235 and latch magnets 242 and 247 are all connected in parallel across the wires 253 and 254. The wire 253 leads directly to one current supply conductor 255. The second supply conductor 256 is connected to the lead 140 of a synchronizing unit 30 having the same internal connections fully described in connection with Figure 13. The external lead 150 of the unit 30 is connected to the wire 254.

A step switch 104, of the type previously described, is connected to the unit 30 by the leads 150, 153, 186, 187 and 195 in the manner also previously set forth. Instead of connections to successively illuminate a series of lamps, however, the switch 104 is adapted to, upon actuation, supply current successively via leads 257, 257a, 257b, 257c and 257d to a series of five solenoids 258, 258a, 258b, 258c, 258d mounted on a phonograph 259, the five solenoids being also connected to the return wire 183 leading back to the unit, 30. In the present case no connection is made to the first contact point of the step-switch, as it is not desired to actuate the identifying means until the first actuation of the switch.

The phonograph 259, of the electrical type adapted to be supplied with current through leads 260 and 261 from the supply lines 255 and 256, has an arbor 263 rotatable in the usual manner and carrying five short cylindrical records 262, 262a, 262b, 262c, 262d. A series of five arms 264, Figure 20, are slidably and rockably mounted on a longitudinal guide rod 265 provided with stop collars 266, as shown in Figure 21. A series of reproducers or pickups 267 on the front ends of arms 264 overlie the respective records on the arbor 263 but are normally held out of engagement with them by light tension springs 268 which urge the front ends of the arms 264 upward and at the same time urge the arms to the left (Figures 19 and 21) against the collars 266. Each arm 264 has secured to the bottom thereof a leaf spring 269 carrying a threaded block 270 adapted to engage a feed screw 271 of the type in common use on dictating machines and the like. The rear ends of arms 264 carry armatures 272 underlying the magnets 258, 258a, etc.

If, when the arbor 263 and feed screw 271 are rotating, the magnet 258 is energized to attract the armature 272, thereby rocking the arm 264, the pickup 267 is brought into engagement with the record 262d at its left or starting end. This engagement takes place before the armature 272 can engage the core of magnet 258d. The block 270 also engages the feed screw 271, causing the pickup to be fed to the right, Figure 19, and thereby actuate the phonograph to play the recording on the record 262d. The armature 272 not being in contact with the core of magnet 258d, no frictional resistance exists at this point, and if desired the armature may be extended to the left as in Figure 19 so that the magnetic pull may assist the screw 271 in feeding the sound head toward the right against the tension of the spring 268. When the magnet 258d is deenergized, the spring 268 again raises and moves the pickup 267 to the left into initial position. Similarly, all the solenoids 258, etc., operate to play their particular records when energized through the step-switch 104. In the case illustrated, the records carry announcements and brief descriptions of successive air-port stops along a scheduled route.

Unit 30 in the present case is equipped with a dial 273 calibrated in terms of mileage as shown in Figure 17, it being desired to indicate the scheduled progress of the plane in terms of distance rather than time, though it is obvious that the apparatus is applicable to either type of schedule. The template 274 likewise has its grooves and bridges so arranged as to cause actuation of the synchronizing mechanism at the proper mileage intervals as the latter are indicated on the dial 273.

The operation of the device is as follows:

When the starting switch 92 on the unit 30 is depressed, a connection is completed within the unit 30 between the leads 140 and 150 in the manner previously described, allowing current to flow through the wires 253 and energize the magnet 242 and 247, the main motor 235, and the propeller motor of the airplane 248. It will be understood that in normal stopped position, the image 240 of the airport is positioned by the belt 233 between the airplane and the background belt 228, the engagement of fin 246 by latch 245 having determined this position at the last stop of the preceding run. As the drums and airplane propeller start to revolve, the latch 245 is also released, and both belts start to move with the same acceleration, so that both the background and airport image move to the left, thus creating the illusion, when viewed through the window 251a, that the airplane 248 is starting to move forward. As the airport image 240 is carried to the left it moves downward over the left inclined shoulder of the guide 234, thus slanting and sinking downward out of view through the window and thereby creating the illusion of the airplane rising or "taking off". The background or sky belt 228 continues to move past the window to continue the illusion of flight, but when the lower belt has moved to bring the image 240 to the position shown in Figure 19, the fin 243 encounters the latch 241 which stops the belt, while the drum 229 continues to revolve by slipping within the belt.

When the unit 30 has progressed the indicated mileage to the first scheduled stop, it opens the circuit between leads 140 and 150 as previously described, thereby deenergizing the motors and latch magnets. The momentum of the moving parts of the display device is sufficient that as the latch 241 releases the fin 243, the image 240 is carried up into position behind the airplane, rising and leveling off as it moves into view to create the illusion that the airplane is landing. When the image reaches central and level position behind the plane its further movement is prevented by engagement of the latch 245 by the fin 246. A friction braking member 275, pressed by a spring backed by an adjusting screw 226, is provided on the shaft 224 as shown in Figure 19. This device may be adjusted to give just sufficient friction to overcome the momentum of the parts and bring the image 240 to a gradual stop just as the fin 246 moves against the latch 245.

At the same time that the current is cut off from the display combination, the step-switch 104 acts through the solenoid 258 to cause the phonograph 259 to play the first record 262, by which means the landing is described, the airport identified, and any other desired information reproduced in sound.

At the end of the desired stop period, predetermined by the setting of the time delay mechanism as previously described, the circuit through leads 140 and 150 is again restored, and the second leg of the flight is simulated in the same manner as set forth, the procedure continuing with stops in accordance with the proper mileage indications and phonographic identifications of ports until the run is completed, after which the step-switch automatically resets and the apparatus is conditioned to repeat the runs if desired.

The foregoing description has brought out the fact that the invention is adapted to synchronously control and identify a series of simulated events having an established interrelationship in terms of time or of an element other than time, namely distance in the case of the airplane display device. Similarly, it will be evident to those skilled in the art that the apparatus also is adaptable to the control of a wide variety of display, amusement or instructive apparatus for setting forth occurrences related in terms other than either those of time or space, such as the demonstration of phenomena related in terms of changing temperatures or pressures, while the identification of the various steps may be by any desired sensory means, as illustrated by the use of visual means in the case of the train control and auditory means in the case of the airplane apparatus.

What is claimed is:

1. In a miniature railway system, in combination, a track adapted to act as an electrical conductor from a source of current to an electric locomotive thereon, a second conductor parallel to said track and adapted to engage said locomotive to complete an operative circuit therethrough from said source of current, said second conductor comprising a charged section and a second section having terminal insulation between the same and said charged section, a normally closed relay and a normally open relay having their switches connected in series between said portions, manually controllable means to close said second relay whereby said locomotive may be started on said second section, a second source of current, a timing device connected to said second source, said timing device including a clock adapted to perform an indicated time cycle at a speed proportional to that of a standard time cycle and commutating means cooperative with said clock, said commutating means including a plurality of contact members, switching means adjustable to selectively establish connections between said contact members and the magnet of said first relay whereby said commutating means may direct current impulses from said second source through said magnet to open the switch of said first relay, whereby said locomotive may be stopped in engagement with said insulated section at intervals during the cycle of said clock, a template adapted to be secured to and in cooperative relation with said switching means to adjust the same and thereby predetermine said intervals in accordance with a selected train schedule, a map exhibiting the route of said schedule, electrical means on said map to identify the stops on said route, electrical conducting means connecting said electrical means with said second source of current and including a step-switch adapted to successively energize said identifying means, a magnet on said step switch, said magnet being connected to said timing device and operable by said impulses to actuate said step-switch, and means operable by said step-switch at the completion of said schedule to open said second relay.

2. The combination as claimed in claim 1 including a second switch on said first relay and operable by the magnet thereof to maintain a circuit through said magnet thereof subsequent to the termination of each of said impulses, means in said timing device to de-energize said magnet after a predetermined duration of time, said de-energizing means being adjustable to vary said duration.

3. In an electric control system for a miniature electric railway including a circuit-carrying track and a locomotive operable thereon, in combination, a timing device including a clock adapted to perform and indicate a time cycle at a speed proportional to the corresponding standard time cycle, circuit breaking means adapted to be connected into said track and operable by said timing device to stop said locomotive at intervals during the cycle of said clock, means on said timing device to predetermine said intervals in indicated accordance with a selected railroad schedule, a map showing the route of said schedule, a plurality of electrically operable devices on said map to identify the locations of train stops on said schedule, means electrically connecting said electrically operable identifying devices and including a step-switch associated with said map and adapted to successively energize said electrically operable identifying devices, and means connected to said timing device and controllable thereby to actuate said switching means in conjunction with said circuit breaking means.

4. A control system as claimed in claim 3 including a plurality of relays connected between said circuit breaking means and different portions of said track and adapted to associate said circuit breaking means with said different portions, the actuating members of said relays being connected to and operable successively by said step switch means.

5. A control system as claimed in claim 3 in which said map displays a plurality of routes each having identifying means and including a selector switch adapted to establish connections from said step switch to the identifying means of any one of said routes.

6. A control system as claimed in claim 3 including means to interchange connections from said step switch to said identifying means whereby said system may be adapted to carry out a schedule for a train in the reverse route.

7. A system as claimed in claim 3 wherein said timing device includes a commutator cooperative with said clock and having a plurality of contact points and wherein said predetermining means includes a plurality of switches disposed between said contact points and the magnet of said first relay, and a template applicable to said switches to close certain of the same whereby electrical connections may be established between the corresponding contact points and the magnet of said first relay in accordance with said schedule.

8. In an electrical timing device, in combination, a casing, a dial on said casing and having indicia, a drive shaft in said casing, means to rotate said drive shaft at a pre-determined speed, means to vary said speed, an indicating hand cooperative with said dial, rotary means permanently geared to said shaft and adapted to revolve said hand at a speed differing from the speed of said shaft in fixed ratio, a relay, electrical means controllable by said geared means to energize said relay at a predetermined point in the continuous rotation of said hand, and means controllable by said shaft to de-energize said relay.

9. In a control device, in combination, a casing, a dial on said casing and having indicia, a drive shaft in said casing, means to rotate said drive shaft at a predetermined speed, an indicating hand cooperative with said dial, rotary means permanently geared to said shaft and adapted to revolve said hand at a speed differing from the speed of said shaft, a relay, electrical means including a commutator having a plurality of contact points and operable by said geared means to transmit electrical impulses to said relay to energize the same, means on said relay to maintain said energization upon termination of each impulse, a member rotatably mounted about said shaft, said member being normally positioned against a stationary stop, electrical means operable by said maintaining means to clutch said member to said drive shaft whereby said member may be rotated, a stationary electrode, an electrode on said member and adapted to engage said stationary electrode, means controllable by said engagement to de-energize said relay, and resilient means to retract said member against said stop.

10. The combination claimed in claim 9 including means to adjust the position of said stationary electrode relative to said fixed stop, whereby the extent of rotation of said member may be predetermined.

11. The combination claimed in claim 9 including a plurality of switches adapted to individually connect said contact points with said relay, and means to selectively close said switches whereby said relay may be successively energized through selected points of said commutator.

12. The combination claimed in claim 9 including a plurality of switches adapted to individually connect said contact points with said relay, and means to selectively close said switches whereby said relay may be successively energized through selected points of said commutator, said closing means comprising a template applicable to said casing to engage said selected switches.

13. The combination claimed in claim 9 including a plurality of switches adapted to individually connect the contact points of said commutator with said relay, and means to selectively close certain of said switches whereby said relay may be energized through said commutator in accordance with a pre-arranged schedule of conjunctions between said hand and said dial indicia, said means comprising a template exhibiting a schedule list of said conjunctions and adapted to engage said selected switches.

14. The combination claimed in claim 9 including a plurality of switches adapted to individually connect the contact points of said commutator with said relay, and means to selectively close certain of said switches whereby said relay may be energized through said commutator in accordance with a prearranged schedule of conjunctions between said hand and said dial indicia, said means comprising a body holding a plurality of detachable plugs adapted to engage said selected switches.

15. In a toy electric railway system having a track and a locomotive cooperative therewith, in combination, means to energize said track whereby said locomotive may travel thereon, a circuit breaker connected to a section of said track and adapted to de-energize said section whereby said locomotive may be stopped thereon, timing means connected to said circuit breaker and adapted to successively actuate the same at intervals proportional to intervals of a pre-arranged schedule of station stops, said timing means including a commutator adapted to complete control circuits and a plurality of switches connected between successive points of said commutator and said circuit breaker, said switches being adapted to be pre-set whereby said control circuits may be established from certain of said points to said circuit-breaker at time intervals in accordance with said schedule, and exterior means on said timing means to indicate said intervals.

16. In a toy electric railway system having a track and a locomotive cooperative therewith, in combination, means to energize said track whereby said locomotive may travel thereon, means to de-energize a pre-determined section of said track whereby said locomotive may be stopped thereon, timing means connected to said de-energizing means and adapted to successively actuate the same at intervals proportional to intervals of a pre-arranged schedule of station stops, said timing means including means to indicate said intervals, adjusting means to pre-condition said timing means to carry out said actuations in accordance with said schedule, a map exhibiting the route of said schedule, and means on said map route connected to said timing means and controllable thereby in conjunction with said de-energizing means to identify said station stops in accordance with said schedule.

17. In a device of the character described, in combination, an electrically operable miniature mechanical device, means to successively actuate said miniature mechanical device, means to control said actuating means whereby said miniature mechanical device may perform a series of operations having a predetermined relationship, means connected to said control means and controllable thereby to successively identify said operations, means to pre-condition said control means to determine said predetermined relationship, and means connected to said control means and operable thereby to indicate said relationship throughout said series.

PAUL ROMAN.
ROBERT BALUTA.